(12) United States Patent
Hoefler et al.

(10) Patent No.: US 10,208,621 B2
(45) Date of Patent: Feb. 19, 2019

(54) SURFACE COOLER AND AN ASSOCIATED METHOD THEREOF

(71) Applicant: General Electric Company, Schenectady, NY (US)

(72) Inventors: Florian Hoefler, Garching b. München (DE); Carlos Enrique Diaz, Garching bei Muenchen (DE); Jorge Alejandro Carretero Benignos, München (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 479 days.

(21) Appl. No.: 14/961,074

(22) Filed: Dec. 7, 2015

(65) Prior Publication Data

US 2017/0159491 A1    Jun. 8, 2017

(51) Int. Cl.
*F01D 25/14* (2006.01)
*F01D 9/02* (2006.01)
(Continued)

(52) U.S. Cl.
CPC .............. *F01D 25/14* (2013.01); *F01D 9/02* (2013.01); *F01D 25/12* (2013.01); *F02C 3/04* (2013.01);
(Continued)

(58) Field of Classification Search
CPC . F01D 25/14; F01D 25/12; F01D 9/02; F02C 3/04; F02C 7/12; F02C 7/14;
(Continued)

(56) References Cited

U.S. PATENT DOCUMENTS

| 4,858,678 A | 8/1989 | Ladd | |
|---|---|---|---|
| 6,179,046 B1 * | 1/2001 | Hwang | H01L 23/467 165/121 |

(Continued)

FOREIGN PATENT DOCUMENTS

| EP | 0132237 A2 | 1/1985 |
|---|---|---|
| EP | 1916399 A2 | 4/2008 |

(Continued)

OTHER PUBLICATIONS

Esmail M. A. Mokheimer,"Heat transfer from extended surfaces subject to variable heat transfer coefficient", Heat and Mass Transfer, vol. 39, Issue 2, Jan. 2003, pp. 131-138.

(Continued)

*Primary Examiner* — Craig Kim
(74) *Attorney, Agent, or Firm* — GE Global Patent Operation; Nitin Joshi (57) ABSTRACT

A surface cooler includes a base component, a plurality of first fins, and a plurality of second fins. The base component has a first surface, a second surface, and a first thermally conductive material. The plurality of first fins extends substantially perpendicular from the first surface and each first fin is characterized by a first height and a first width. The plurality of second fins extends substantially perpendicular from the first surface and each second fin is characterized by a second height and a second width. One or more fins of the plurality of first fins are disposed between a pair of adjacent fins of the plurality of second fins and an average first height of the plurality of first fins is lower than an average second height of the plurality of second fins. The plurality of fins reduces air drag and augments heat transfer capacity of surface cooler.

28 Claims, 9 Drawing Sheets

(51) Int. Cl.
*F01D 25/12* (2006.01)
*F02C 3/04* (2006.01)
*F02C 7/12* (2006.01)

(52) U.S. Cl.
CPC ...... *F02C 7/12* (2013.01); *F05D 2260/22141* (2013.01)

(58) Field of Classification Search
CPC .. F02C 7/141; F02C 7/143; F02C 7/16; F02C 7/18; F02C 7/185; F28F 13/06; F28F 13/08; F28F 13/10; F28F 13/12; F28F 3/02; F28F 3/025
See application file for complete search history.

(56) References Cited

U.S. PATENT DOCUMENTS

| | | | |
|---|---|---|---|
| 6,466,444 | B2 * | 10/2002 | Cheung ................. H01L 23/467 165/185 |
| 6,602,048 | B2 * | 8/2003 | Fujikawa ................. F01D 9/00 415/116 |
| 8,580,211 | B2 | 11/2013 | Tonkovich et al. |
| 8,601,792 | B2 | 12/2013 | Mylemans |
| 2004/0228781 | A1 | 11/2004 | Tonkovich et al. |
| 2010/0108289 | A1 | 5/2010 | Guinan et al. |
| 2011/0302928 | A1 | 12/2011 | Mudawar |
| 2012/0024510 | A1 | 2/2012 | Kohl et al. |
| 2012/0285138 | A1 | 11/2012 | Todorovic |
| 2013/0219854 | A1 | 8/2013 | Alecu |
| 2014/0027102 | A1 | 1/2014 | Antel, Jr. et al. |
| 2014/0144139 | A1 | 5/2014 | Alecu et al. |
| 2014/0145107 | A1 | 5/2014 | Bromberg et al. |
| 2015/0000865 | A1 | 1/2015 | Ueda |

FOREIGN PATENT DOCUMENTS

| | | |
|---|---|---|
| EP | 2682702 A1 | 1/2014 |
| JP | 1061438 A | 3/1998 |

OTHER PUBLICATIONS

Dhanawade K.H. et al.,"Enhancement of forced convection heat transfer from fin arrays with circular perforation", Frontiers in Automobile and Mechanical Engineering (FAME), Nov. 2010, pp. 192-196.

* cited by examiner

SURFACE COOLER AND AN ASSOCIATED METHOD THEREOF

BACKGROUND

The present technique disclosed herein generally relates to heat exchangers, and more specifically, to a design of an enhanced heat exchanger, in the form of a surface cooler.

Surface coolers, such as, oil-to-air heat exchangers are generally disposed around a fan duct region of aircraft engines. Such surface coolers are designed to dissipate heat generated by the aircraft engines. Typically, the surface coolers include fins that protrude towards a flow path defined by such fan duct region so as to exchange heat with air flowing in the flow path, thereby regulate temperature of the aircraft engines. However, such fins may obstruct the air flow around the fan duct region, thereby causing aerodynamic losses to the aircraft engines. The obstruction caused by the fins, may also result in creating pressure drop and drag, thereby result in decreasing overall performance of the aircraft engines.

Thus, there is a need for an improved surface cooler having augmented heat transfer capacity without unfavorable pressure drops and drags.

BRIEF DESCRIPTION

In accordance with one embodiment, a surface cooler for turbomachines, such as, engine is disclosed. In accordance with aspects of the present technique, the surface cooler includes a base component having a first surface and a second surface, where the base component includes a first thermally conductive material. The surface cooler further includes a plurality of first fins extending substantially perpendicular from the first surface of the base component, where each fin of the plurality of first fins is characterized by a first height and a first width. Further, the surface cooler includes a plurality of second fins extending substantially perpendicular from the first surface of the base component, where each fin of the plurality of second fins is characterized by a second height and a second width. One or more fins of the plurality of first fins are disposed between a pair of adjacent fins of the plurality of second fins. An average first height of the plurality of first fins is lower than an average second height of the plurality of second fins. The plurality of first fins and second fins are configured to reduce air drag and augment heat transfer capacity of the surface cooler, by enhancing air flow rates between pairs of adjacent first fins or second fins and facilitating mixing of air in inter-fin passages defined around the plurality of first fins and second fins.

In accordance with another embodiment, an engine, such as, a gas turbine engine is disclosed. In accordance with aspects of the present technique, the engine includes a core engine, a fan assembly, and a surface cooler. The core engine includes an engine casing and the fan assembly includes a fan casing and an outlet guide vane disposed between the engine casing and the fan casing. The surface cooler is coupled to at least one or both of i) a portion of the engine casing and ii) a portion of the fan casing. The surface cooler includes a base component having a first surface and a second surface, where the base component includes a first thermally conductive material. The surface cooler further includes a plurality of first fins extending substantially perpendicular from the first surface of the base component, where each fin of the plurality of first fins is characterized by a first height and a first width. Further, the surface cooler includes a plurality of second fins extending substantially perpendicular from the first surface of the base component, where each fin of the plurality of second fins is characterized by a second height and a second width. One or more fins of the plurality of first fins are disposed between a pair of adjacent fins of the plurality of second fins. An average first height of the plurality of first fins is lower than an average second height of the plurality of second fins. The plurality of first fins and second fins are configured to reduce air drag and augment heat transfer capacity of the surface cooler, by enhancing air flow rates between pairs of adjacent first fins or second fins and facilitating mixing of air in inter-fin passages defined around the plurality of first fins and second fins.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

Embodiments discussed herein disclose a surface cooler for turbomachines, such as, an engine. In some embodiments, such surface cooler may be coupled to one or both of a core engine casing and a fan casing of the engine. The surface cooler may be disposed proximate to an upstream end of an outlet guide vane coupled between the fan casing and the core engine casing. In some other embodiments, the surface cooler may be disposed proximate to a downstream end of the outlet guide vane. In some embodiments, the surface cooler may be disposed extending completely or partially along a circumference of the core engine casing and the fan casing. In certain embodiments, the surface cooler includes a base component, a plurality of first fins, and a plurality of second fins. The plurality of first fins and second fins extend substantially perpendicular from the base component. One or more fins of the plurality of first fins are disposed between a pair of adjacent fins of the plurality of second fins. The plurality of first fins is characterized by a first height and a first width and the plurality of second fins is characterized by a second height and a second width. An average first height of the plurality of first fins is lower than an average second height of the plurality of second fins.

In certain embodiments, the first height of the plurality of first fins is configured to be gradually increased or decreased along at least one of a circumferential direction and an axial direction of the engine. In such embodiments, the second height of the plurality of second fins is maintained constant. In certain other embodiments, the second height of the plurality of second fins is configured to be gradually increased or decreased along the circumferential or the axial direction of the engine. In such embodiments, the first height of the plurality of first fins is maintained constant.

In certain embodiments, at least one fin of the plurality of first fins may include discrete first sub-fins. Similarly, at least one fin of the plurality of second fins may include discrete second sub-fins. The first height of such discrete first sub-fins is configured to be increased, decreased, or both along the axial direction of the engine. Similarly, the second height of such discrete second sub-fins is configured to be increased, decreased, or both along the axial direction of the engine. The plurality of first fins and second fins having different heights reduce air drag, pressure drop, and augment heat transfer capacity of the surface cooler. In one or more embodiments, a high flow rate of air is derived between pairs of adjacent larger first fins or between pairs of adjacent larger second fins. The smaller first fins or smaller second fins enhance heat dissipation through increased surface area and through flow conditioning, e.g. vortex shedding or enhanced mixing of airstream in inter-fin passages defined around the first fins and second fins. In one embodiment, the first height of the plurality of first fins 64 is a range from about 20 percent to about 80 percent of the second height of the plurality of second fins 66. The surface cooler having such customized fin heights facilitates optimal flow of the fluid, thereby maximizes heat dissipation capacity and minimizes pressure drop or drag.

Figure 1:
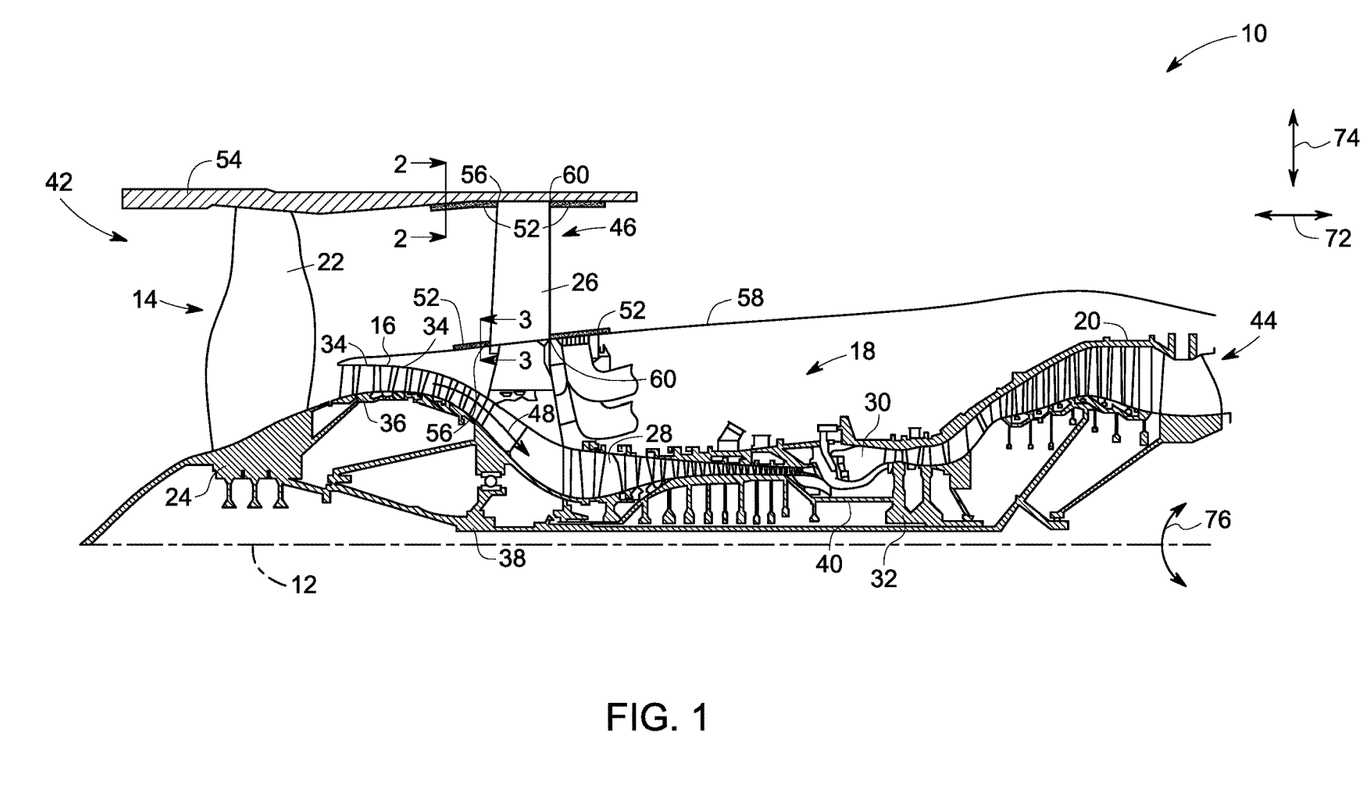
FIG. 1 is a schematic cross-sectional view of an engine, in accordance with aspects of the present technique.

FIG. 1 illustrates a schematic cross-sectional view of a turbomachine, such as, an engine 10 in accordance with one embodiment of the present technique. In the embodiment shown, the reference numeral 12 represents a centerline axis 12 of the engine 10. It should be noted herein that reference numeral 72 represents an axial direction of the engine 10, reference numeral 74 represents a radial direction of the engine 10, and reference numeral 76 represents a circumferential direction of the engine 10.

In one embodiment, the engine 10 includes a fan assembly 14, a booster compressor 16, a core engine 18, such as, a gas turbine engine, and a low-pressure turbine 20 that may be coupled to the fan assembly 14 and the booster compressor 16. The fan assembly 14 includes a rotor fan blade 22 that extends substantially radially outward from a fan rotor disk 24, an outlet guide vane 26 positioned downstream of the rotor fan blade 22, and a fan casing 54 encompassing the rotor fan blade 22 and the outlet guide vane 26. The core engine 18 includes a high-pressure compressor 28, a combustor 30, and a high-pressure turbine 32 (collectively referred as "components of the engine"). The core engine 18 further includes an engine casing 58 encompassing the components of the engine. The outlet guide vane 26 is disposed between the engine casing 58 and the fan casing 54. The booster compressor 16 includes a plurality of rotor blades 34 that extend substantially radially outward from a compressor rotor disk 36 coupled to a first drive shaft 38. The high-pressure compressor 28 and the high-pressure turbine 32 are coupled together by a second drive shaft 40. The engine 10 also includes an intake side 42, a core engine exhaust side 44, and a fan exhaust side 46.

During operation, the fan assembly 14 compresses air entering the engine 10 through the intake side 42. The airstream exiting the fan assembly 14 is split such that a portion of the airflow 48 is channeled into the booster compressor 16, as compressed airstream, and a remaining portion (also referred as a bypass airstream 50) of the airstream bypasses the booster compressor 16 and the core engine 18 and exits the engine 10 through the fan exhaust side 46. The plurality of rotor blades 34 compresses and delivers the compressed airflow 48 towards the core engine 18. The airflow 48 is further compressed by the high-pressure compressor 28 and is delivered to the combustor 30. The compressed airflow 48 from the combustor 30 drives the rotating high-pressure turbine 32 and the low-pressure turbine 20 and exits the engine 10 through the core engine exhaust side 44.

In accordance with aspects of the present technique, a surface cooler 52 is coupled to one or both of the fan casing 54 and the engine casing 58 to dissipate heat generated by the core engine 18 or the fan assembly 14. In such embodiments, the surface cooler 52 is configured to extend along the circumference of one or both of fan casing 54 and engine casing 58. In accordance to one embodiment, the surface cooler 52 may include a base component, a plurality of first fins, and a plurality of second fins (not shown in FIG. 1). The plurality of first fins and second fins may extend substantially perpendicular from the base component. In one embodiment, the surface cooler 52 is disposed proximate to an upstream end 56 of the outlet guide vane 26 and proximate to a downstream end 60 of the outlet guide vane 26. The term "proximate to an upstream end" as used in this context means a portion disposed beyond the rotor fan blade 22 and before the outlet guide vane 26. The term "proximate to a downstream end" as used in this context means a portion disposed beyond the outlet guide vane 26. In some embodiments, the term upstream end 56 and downstream end 60 are relative to a direction of air (i.e. bypass airstream 50) flowing through the surface cooler 52. In the embodiment shown, the surface cooler 52 is coupled to the fan casing 54 and the engine casing 58 and is disposed proximate to the upstream end 56 and downstream end 60 of the outlet guide vane 26. The surface cooler 52 is discussed in greater detail below.

In one embodiment, the base component includes a first thermally conductive material, the plurality of first fins includes a second thermally conductive material, and the plurality of second fins includes a third thermally conductive material. In some embodiments, the first, second, and third thermally conductive materials may include aluminum. In some other embodiments, the first, second, and third thermally conductive materials may include titanium or steel. By way of example, the first, second, and third thermally conductive materials may have thermal conductivity in a range from about 14 W/m*K to about 390 W/m*K. It may be noted that in some embodiments, the first, second, and third thermally conductive materials may include a foam material. In some embodiments, the foam material may include carbon foams having thermal conductivity in a range from about 150 W/m*K to about 390 W/m*K. In some other embodiments, the foam material may include metal foams, such as, an aluminum foam with a thermal conductivity of about 189 W/m*K. In certain embodiment, the first, second, and third thermally conductive materials include one of the metal, the metal foam, the carbon foam, or combinations thereof. In one embodiment, the first, second, and third thermally conductive material may facilitate a reduction of an overall weight of the surface cooler 52 and may control a heat conduction path within the surface cooler 52 in multiple directions 72, 74, 76 of the engine 10.

Figure 2:
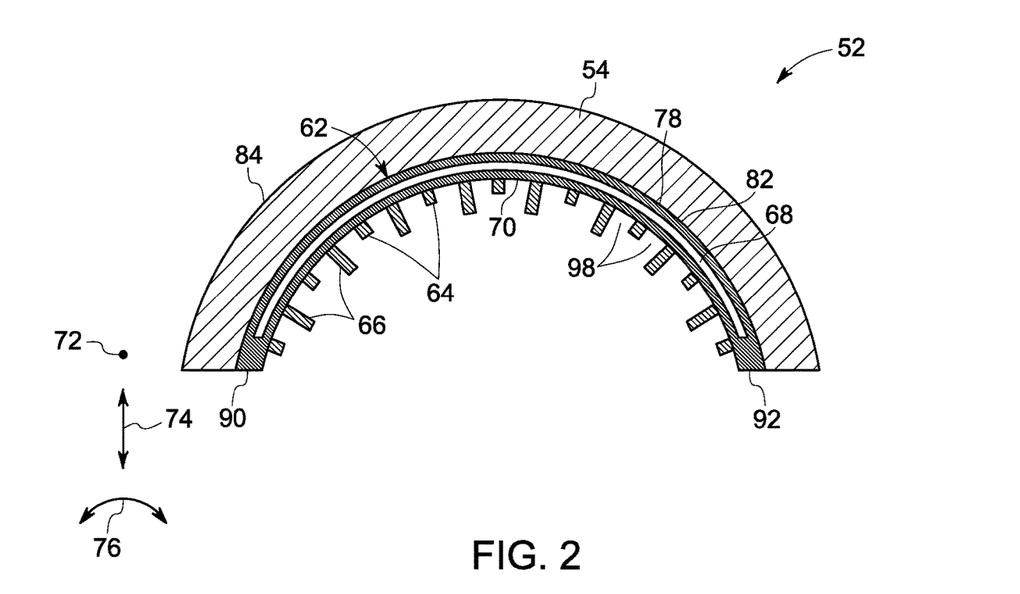
FIG. 2 is a schematic cross-sectional view of a surface cooler taken along line FIG. 2-2 in FIG. 1, in accordance with aspects of the present technique.

FIG. 2 is a schematic cross-sectional view of a surface cooler 52 taken along line FIG. 2-2 in FIG. 1 in accordance with the embodiment of the present technique. The surface cooler 52 is coupled a fan casing 54 and is disposed along a circumferential direction 76 of an engine. The surface cooler 52 extends up to 180 degrees of the fan casing 54. In some embodiments, the surface cooler 52 may extend about 360 degrees of the fan casing 54 depending on the application and design criteria. The surface cooler 52 includes a base component 62, a plurality of first fins 64, and a plurality of second fins 66.

In one embodiment, the base component 62 is coupled to an inner surface 82 of the fan casing 54. In such embodiments, an outer surface 84 of the fan casing 54 may be exposed to an ambient environment. The base component 62 includes at least one conduit 68 extending from a first peripheral side 90 of the base component 62 to a second peripheral side 92 of the base component 62. In some embodiments, the conduit 68 may be a channel-like structure or a tube-like structure, disposed within the base component 62. The conduit 68 may be configured to receive a fluid and circulate the received fluid within the conduit, thereby cooling various components of an engine. In some embodiments, the fluid may be oil, water, refrigerant, air, nitrogen, helium, and the like.

In one embodiment, the plurality of first fins 64 and the plurality of second fins 66 extend substantially perpendicular from a first surface 70 of the base component 62. In such embodiments, a second surface 78 of the base component 62 is coupled to the inner surface 82 of the fan casing 54. Specifically, the plurality of first fins 64 and the plurality of second fins 66 extend radially inward from the first surface 70 of the base component 62. The one or more fins of the plurality of first fins 64 are disposed between a pair of adjacent fins of the plurality of second fins 66. The plurality of first fins 64 and the plurality of second fins 66 may be oriented substantially parallel to the bypass airstream 50. It may be noted that the bypass airstream 50 flows along an axial direction 72 of the engine. The surface cooler 52 as discussed herein may reduce air drag and pressure drop by enhancing air flow rates between pairs of adjacent first fins 64 or second fins 66. Further, the surface cooler 52 may augment heat transfer capacity by improving surface area and facilitating mixing of bypass airstream 50 in inter-fin passages 98 defined around the plurality of first fins 64 and the plurality of second fins 66.

Figure 3:
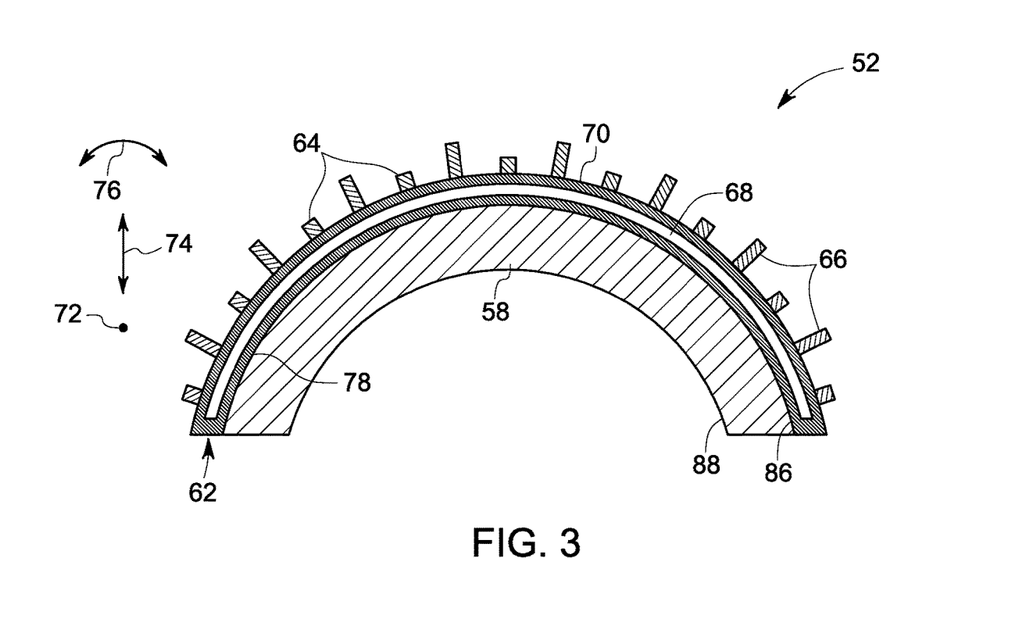
FIG. 3 is a schematic cross-sectional view of a surface cooler taken along line FIG. 3-3 in FIG. 1, in accordance with aspects of the present technique.

FIG. 3 is a schematic cross-sectional view of a surface cooler 52 taken along line FIG. 3-3 in FIG. 1 in accordance with the embodiment of the present technique. The surface cooler 52 is coupled to an engine casing 58 and is disposed along a circumferential direction 76 of an engine. In the embodiment shown, the surface cooler 52 extends up to 180 degrees of the engine casing 58. In the embodiment shown, the base component 62 is coupled to an outer surface 86 of the engine casing 58. In such embodiments, an inner surface 88 of the engine casing 58 may encompass the components of the engine. Specifically, the plurality of first fins 64 and the plurality of second fins 66 extend radially outward from the first surface 70 of the base component 62.

Figure 4:
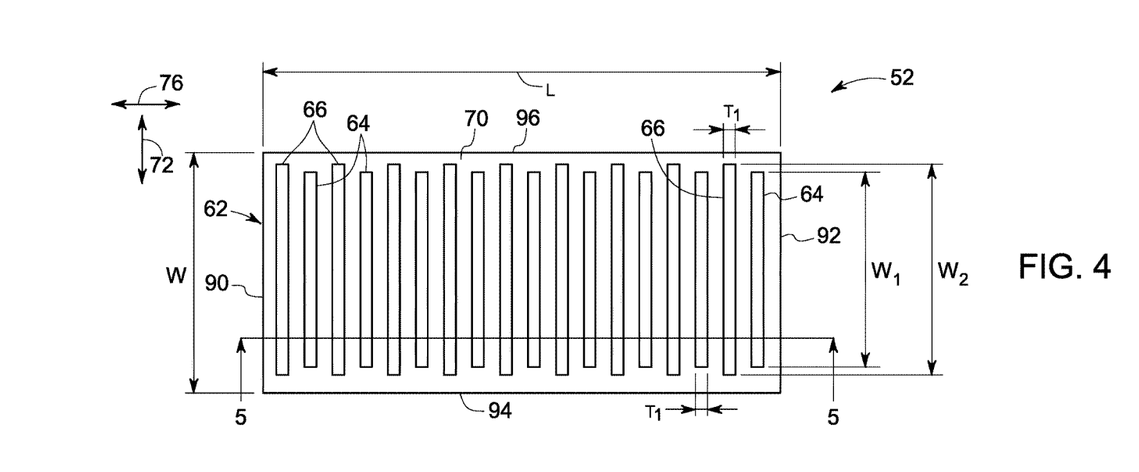
FIG. 4 is a schematic representation of a top view of the surface cooler, in accordance with aspects of FIGS. 1, 2, and 3 of the present technique.

FIG. 4 illustrates a schematic representation of a top view of the surface cooler 52 as discussed in the embodiments of FIGS. 1, 2, and 3.

In one embodiment, the base component 62 is characterized by a width "W" extending along an axial direction 72 of an engine and a length "L" extending along a circumferential direction 76 of the engine. Each fin among the plurality of first fins 64 is characterized by a first width "$W_1$" and each fin among the plurality of second fins 66 is characterized by a second width "$W_2$". The first width "$W_1$" and the second width "$W_2$" extend along the axial direction 72 the engine. In one embodiment, the first width "$W_1$" of the plurality of first fins 64 and second width "$W_2$" of the plurality of second fins 66 are different. In some other embodiments, the first width "$W_1$" and second width "$W_2$" may be substantially equal, depending on the application and design criteria. In one embodiment, the width "W" of the base component 62 is different from the first width "$W_1$" and the second width "$W_2$". In certain embodiments, the width "W" may be equal to the first width "$W_1$" and the second width "$W_2$" depending on the application and design criteria. The width "W" of the base component 62 is in a range from about 50 mm to about 500 mm. The first width "$W_1$" is in a range from about 50 mm to about 500 mm and the second width "$W_2$" is in a range from about 50 mm to about 500 mm. Further, an average second width "$W_2$" of the plurality of second fins 66 is greater than an average first width "$W_1$" of the plurality of first fins 64. In one embodiment, the average first width "$W_1$" is about 200 mm and the average second width "$W_2$" is about 275 mm. Although not illustrated in the embodiment of FIG. 4, the first width "$W_1$" or the second "$W_2$" may gradually vary along the circumferential direction 76 of the surface cooler 52 depending on the application and design criteria. Such a variation of the first width "$W_1$" and the second "$W_2$" may facilitate to maximize the heat dissipation capacity and reduce pressure drop or drag in the surface cooler 52.

Each fin among the plurality of first fins 64 and the plurality of second fins 66 have a thickness "$T_1$" extending along the axial direction 72 the engine. In one embodiment, the thickness "$T_1$" of the plurality of first fins 64 and the plurality of second fins 66 are equal. In some other embodiments, the thickness "$T_1$" of the plurality of first fins 64 and the plurality of second fins 66 may be different, depending on the application and design criteria. In the embodiment shown, the base component 62 has a first peripheral side 90, a second peripheral side 92, a third peripheral side 94, and a fourth peripheral side 96. The thickness "$T_1$" of the plurality of first fins 64 and the plurality of second fins 66 are in a range from 1 mm to about 2 mm. In one embodiment, a minimum length "L" of the base component 62 is about 150 mm.

Figure 5:
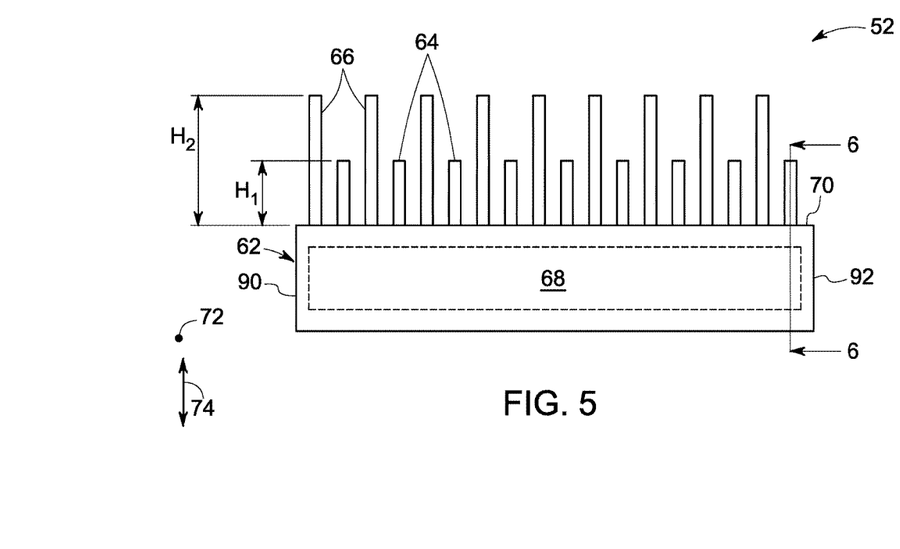
FIG. 5 is a schematic cross-sectional view of the surface cooler taken along line FIG. 5-5 in FIG. 4, in accordance with aspects of the present technique.

FIG. 5 is a cross-sectional view of the surface cooler 52 taken along line FIG. 5-5 in FIG. 4 in accordance with the embodiment of the present technique. In one embodiment, one fin of the plurality of first fins 64 is disposed between a pair of adjacent fins of the plurality of second fins 66. The plurality of first fins 64 is characterized by a first height "$H_1$" and the plurality of second fins 66 is characterized by a second height "$H_2$". Further, an average first height "$H_1$" of the plurality of first fins 64 is lower than an average second height "$H_2$" of the plurality of second fins 66. The base component 62 includes a conduit 68 extending from a first peripheral side 90 to a second peripheral side 92 and is configured to receive the fluid. In one embodiment, the first height "$H_1$" is a range from about 20 percent to about 80 percent of the second height "$H_2$". The first height "$H_1$" is in a range from about 2 mm to about 20 mm and the second height "$H_2$" is in a range from about 8 mm to about 25 mm. The average first height "$H_1$" is about 11 mm and the average second height "$H_1$" is about 17 mm. The spacing between two adjacent first fins 64 or second fins 66 (i.e. nos. of fins per inch) are in a range from about 1 mm to about 15 mm. As discussed herein the surface cooler 52 having an optimal height, width, and thickness minimizes pressure drop or drag and maximizes heat dissipation in comparison with a conventional surface cooler. For example, in the conventional surface cooler, a plurality of fins may have substantially greater height, width, and thickness to maximize heat dissipation, however, disadvantageously such a design may result in increased pressure drop or drag.

Figure 6:
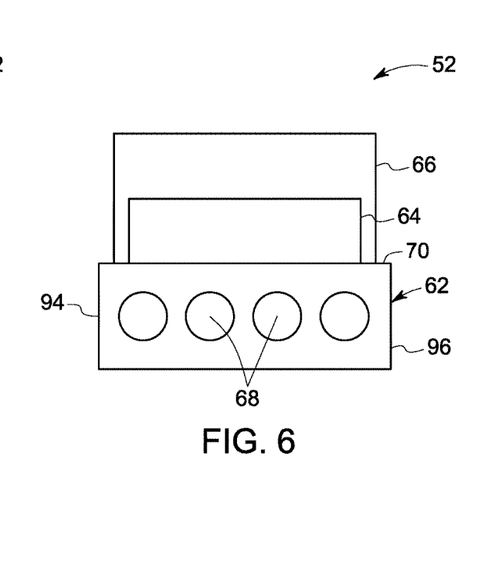
FIG. 6 is a schematic cross-sectional view of the surface cooler taken along line FIG. 6-6 in FIG. 5, in accordance with aspects of the present technique.

FIG. 6 is a cross-sectional view of the surface cooler 52 taken along line FIG. 6-6 in FIG. 5 in accordance with the embodiment of the present technique. In one embodiment, the base component 62 includes a plurality of conduits 68 extending from a second peripheral side 92 to a first peripheral side 90 (as shown in FIG. 4). The plurality of conduits 68 is interconnected to each other and disposed within the base component 62. The plurality of conduits 68 is configured to receive a fluid, as discussed in the embodiment of FIG. 2, and dissipate the heat from a gas turbine to a surrounding environment or to the plurality of first and second fins 64, 66 via the base component 62. In some embodiments, the fluid may be oil, water, refrigerant, air, nitrogen, helium, and the like.

Figure 7:
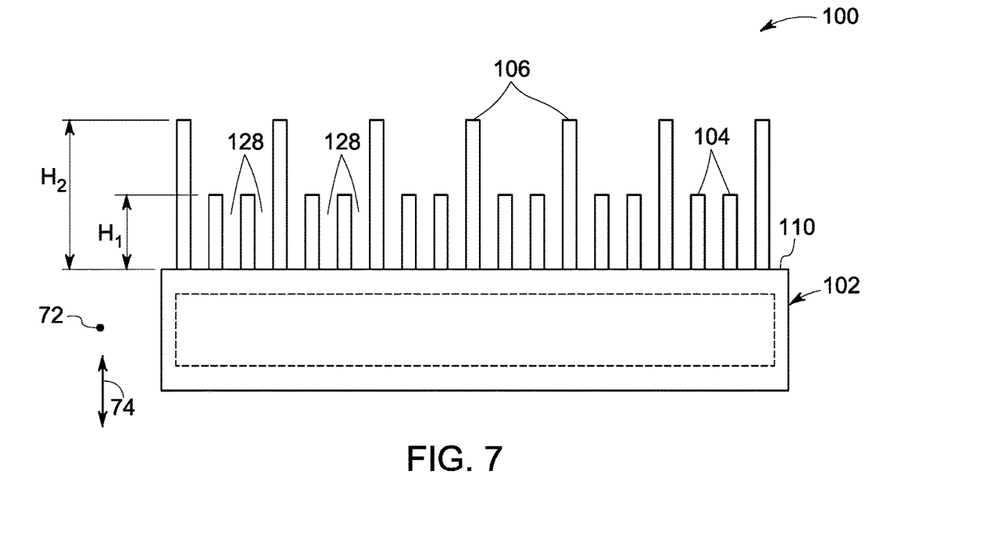
FIG. 7 is a schematic representation of a surface cooler, in accordance with aspects of the present technique.

FIG. 7 is a schematic representation of a surface cooler 100 in accordance with one embodiment of the present technique. In one embodiment, the surface cooler 100 includes a base component 102, a plurality of first fins 104, and a plurality of second fins 106.

The plurality of first fins 104 and the plurality of second fins 106 extend substantially perpendicular from a first surface 110 of the base component 102. In the embodiment shown, at least two first fins 104 are disposed between a pair of adjacent fins of the plurality of second fins 106. In one embodiment, at least two first fins 104 disposed between the pair of adjacent second fins 106 may increase surface area and mixing of the bypass airstream in inter-fin passages 128 defined around the plurality of first fins 104 and the plurality of second fins 106, thereby improving a heat dissipation capacity of the surface cooler 100.

Figure 8:
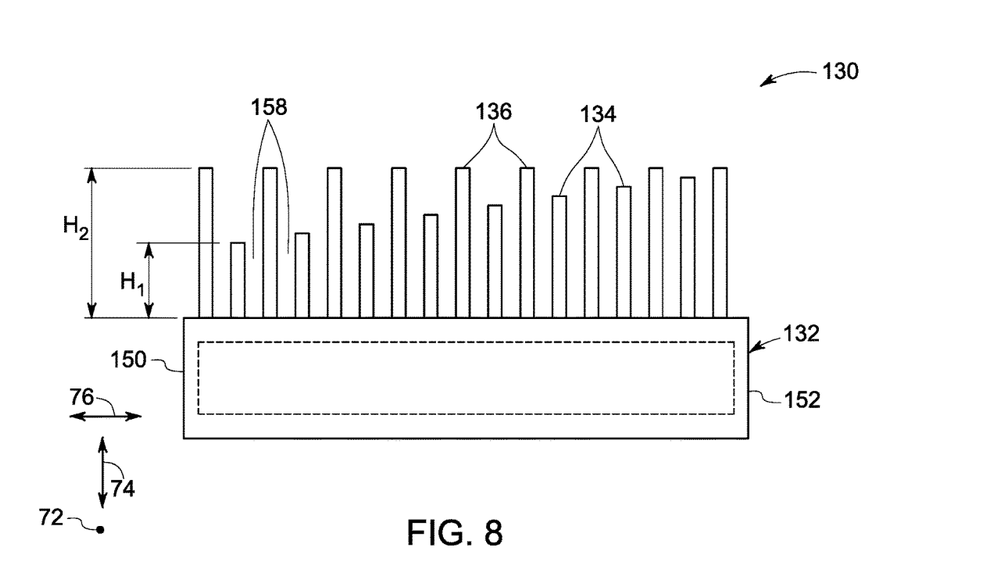
FIG. 8 is a schematic representation of a surface cooler having a plurality of gradually increased first fins, in accordance with aspects of the present technique.

FIG. 8 is a schematic representation of a surface cooler 130 in accordance with one embodiment of the present technique. In one embodiment, the surface cooler 130 includes a base component 132, a plurality of first fins 134, and a plurality of second fins 136.

In the embodiment shown, one first fin 134 is disposed between a pair of adjacent fins of the plurality of second fins 136. Each first fin 134 is characterized by a first height "$H_1$" and each second fin 136 is characterized by a second height "$H_2$". The first height "$H_1$" and the second height "$H_2$" extend along a radial direction 74 of an engine. The first height "$H_1$" is configured to be gradually increased along a circumferential direction 76 of the engine. Specifically, the first height "$H_1$" is gradually increased from a first peripheral side 150 of the base component 132 to a second peripheral side 152 of the base component 132. In such embodiments, the second height "$H_2$" is configured to be substantially uniform along the circumferential direction 76 of the engine.

In some embodiments, the first height "$H_1$" may be configured to be gradually decreased along the circumferential direction 76 of the engine. In such embodiments, the second height "$H_2$" may be configured to be substantially uniform along the circumferential direction 76 of the engine.

During operation, a bypass airstream is configured to flow along an axial direction 72 of the engine. In one embodiment, one or more fins of the plurality of second fins 136 having a significantly greater second height "$H_2$" that aids in reducing air drag and pressure drop, thereby improving the efficiency of the surface cooler 130. The plurality of first fins 134 having significantly smaller first fin height "$H_1$" increase surface area and mixing of the bypass airstream in inter-fin passages 158 defined around the plurality of first fins 134 and the plurality of second fins 136, thereby improving a heat dissipation capacity of the surface cooler 130.

Figure 9:
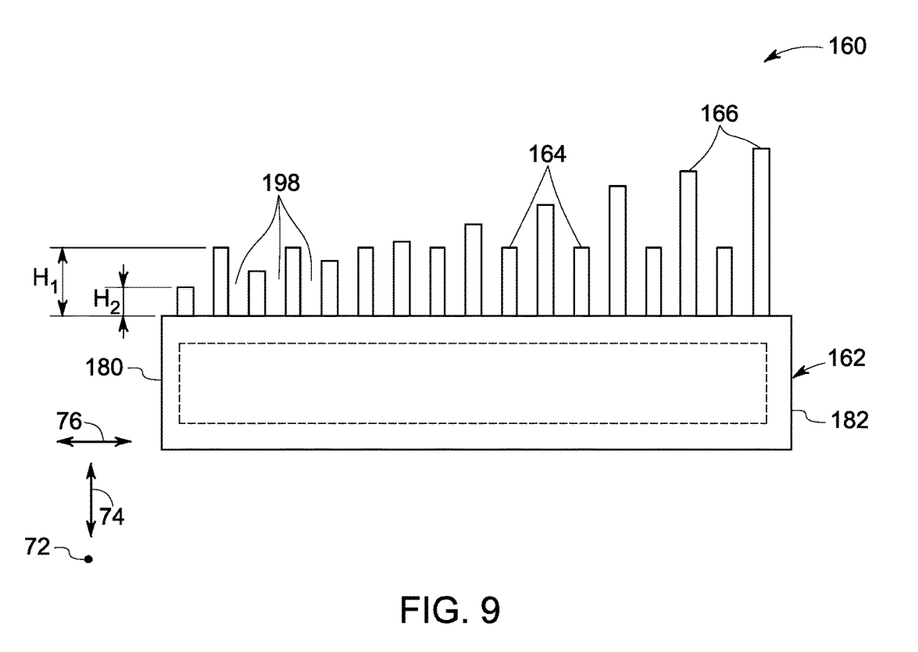
FIG. 9 is a schematic representation of a surface cooler having a plurality of gradually increased second fins, in accordance with aspects of the present technique.

FIG. 9 is a schematic representation of a surface cooler 160 in accordance with one embodiment of the present technique. In one embodiment, the surface cooler 160 includes a base component 162, a plurality of first fins 164, and a plurality of second fins 166.

Each first fin 164 is characterized by a first height "$H_1$" and each second fin 166 is characterized by a second height "$H_2$". The first height "$H_1$" and the second height "$H_2$" extend along a radial direction 74 of an engine. The second height "$H_2$" is configured to be gradually increased along a circumferential direction 76 of the engine. Specifically, the second height "$H_2$" is gradually increased from a first peripheral side 180 of the base component 162 to a second peripheral side 182 of the base component 162. In such embodiments, the first height "$H_1$" is configured to be substantially uniform along the circumferential direction 76 of the engine.

In some embodiments, the second height "$H_2$" may be configured to be gradually decreased along the circumferential direction 76 of the engine. In such embodiments, the first height "$H_1$" may be configured to be substantially uniform along the circumferential direction 76 of the engine.

In one embodiment, one or more fins of the plurality of first fins 164 having a significantly greater first height "$H_1$" may aid in reducing air drag and pressure drop, thereby improving the efficiency of the surface cooler 160. The plurality of second fins 166 having significantly smaller second fin height "$H_2$" may increase surface area and mixing of the bypass airstream in inter-fin passages 198 defined around the plurality of first fins 164 and the plurality of second fins 166, thereby improving a heat dissipation capacity of the surface cooler 160.

Figure 10:
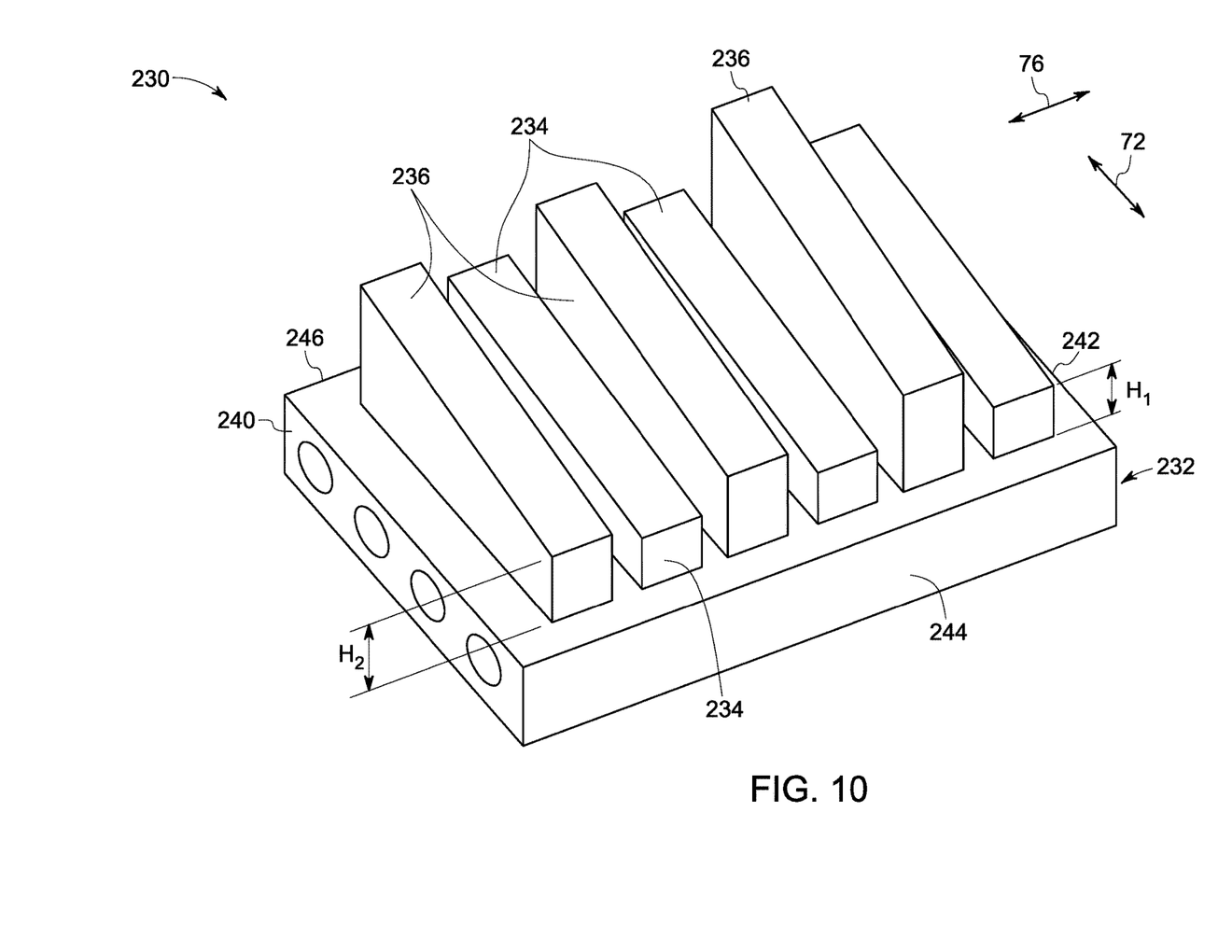
FIG. 10 is a perspective view of a surface cooler having a plurality of gradually increased first fins, in accordance with aspects of the present technique.

FIG. 10 is a schematic representation of a surface cooler 230 in accordance with one embodiment of the present technique. In one embodiment, the surface cooler 230 includes a base component 232, a plurality of first fins 234, and a plurality of second fins 236.

In the embodiment shown, one first fin 234 is disposed between a pair of adjacent fins of the plurality of second fins 236. The base component 232 has a first peripheral side 240, a second peripheral side 242, a third peripheral side 244, and a fourth peripheral side 246. In one embodiment, each first fin 234 is characterized by a first height "$H_1$" which is configured to be gradually increased along an axial direction 72 of the engine. Specifically, the first height "$H_1$" is gradually increased from the third peripheral side 244 to the fourth peripheral side 246. In one embodiment, each second fin 236 is characterized by a second height "$H_2$" which is configured to be gradually increased along a circumferential direction 76 and along the axial direction 72, of the engine. Specifically, the second height $H_2$" is gradually increased from the first peripheral side 240 to the second peripheral side 242, and from the third peripheral side 244 to the fourth peripheral side 246.

In some embodiments, the second height "$H_2$" may be configured to be gradually decreased along the circumferential direction 76 and gradually increased along the axial direction 72 of the engine. In such embodiments, the first height "$H_1$" may be configured to be substantially uniform along the circumferential direction 76 and gradually increased along the axial direction 72 of the engine. The surface cooler 230 as discussed herein may reduce air drag, pressure drop, and augment heat transfer capacity.

Figure 11:
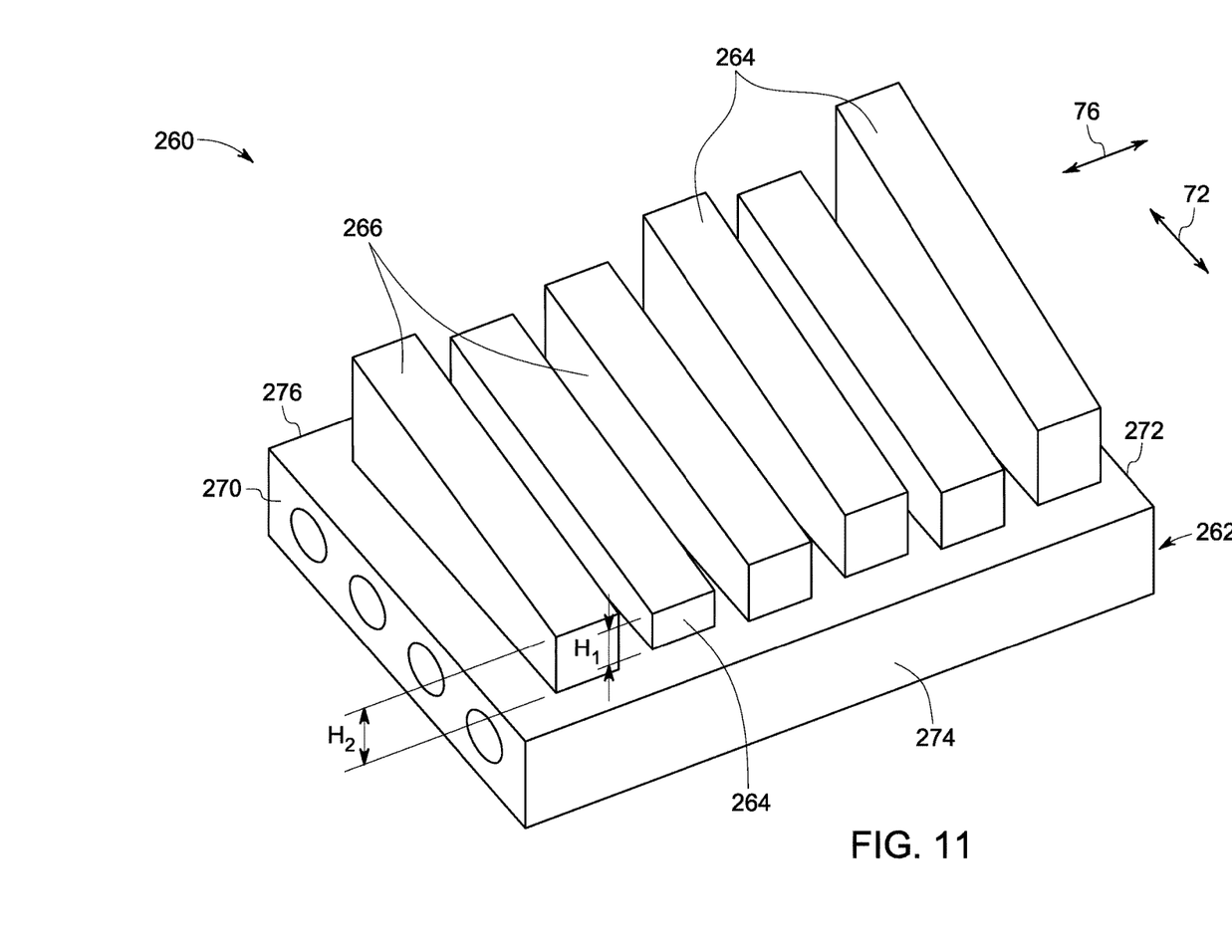
FIG. 11 is a perspective view of a surface cooler having a plurality of gradually increased second fins, in accordance with aspects of the present technique.

FIG. 11 is a schematic representation of a surface cooler 260 in accordance with one embodiment of the present technique. In one embodiment, the surface cooler 260 includes a base component 262, a plurality of first fins 264, and a plurality of second fins 266.

In the embodiment shown, one first fin 264 is disposed between a pair of adjacent fins of the plurality of second fins 266. The base component 262 has a first peripheral side 270, a second peripheral side 272, a third peripheral side 274, and a fourth peripheral side 276. In one embodiment, each first fin 264 is characterized by a first height "$H_1$" which is configured to be gradually increased along a circumferential direction 76 and along an axial direction 72, of the engine. Specifically, the first height "$H_1$" is gradually increased from the first peripheral side 270 to the second peripheral side 272, and from the third peripheral side 274 to the fourth peripheral side 276. In one embodiment, each second fin 266 is characterized by a second height "$H_2$" which is configured to be gradually increased along the axial direction 72 of the engine. Specifically, the second height "$H_2$" is gradually increased from the third peripheral side 274 to the fourth peripheral side 276.

In some embodiments, the first height "$H_1$" may be configured to be gradually decreased along the circumferential direction 76 and gradually increased along the axial direction 72 of the engine. In such embodiments, the second height "$H_2$" may be configured to be substantially uniform along the circumferential direction 76 and gradually increased along the axial direction 72 of the engine. The surface cooler 260 as discussed herein may reduce air drag, pressure drop, and augment heat transfer capacity.

Figure 12:
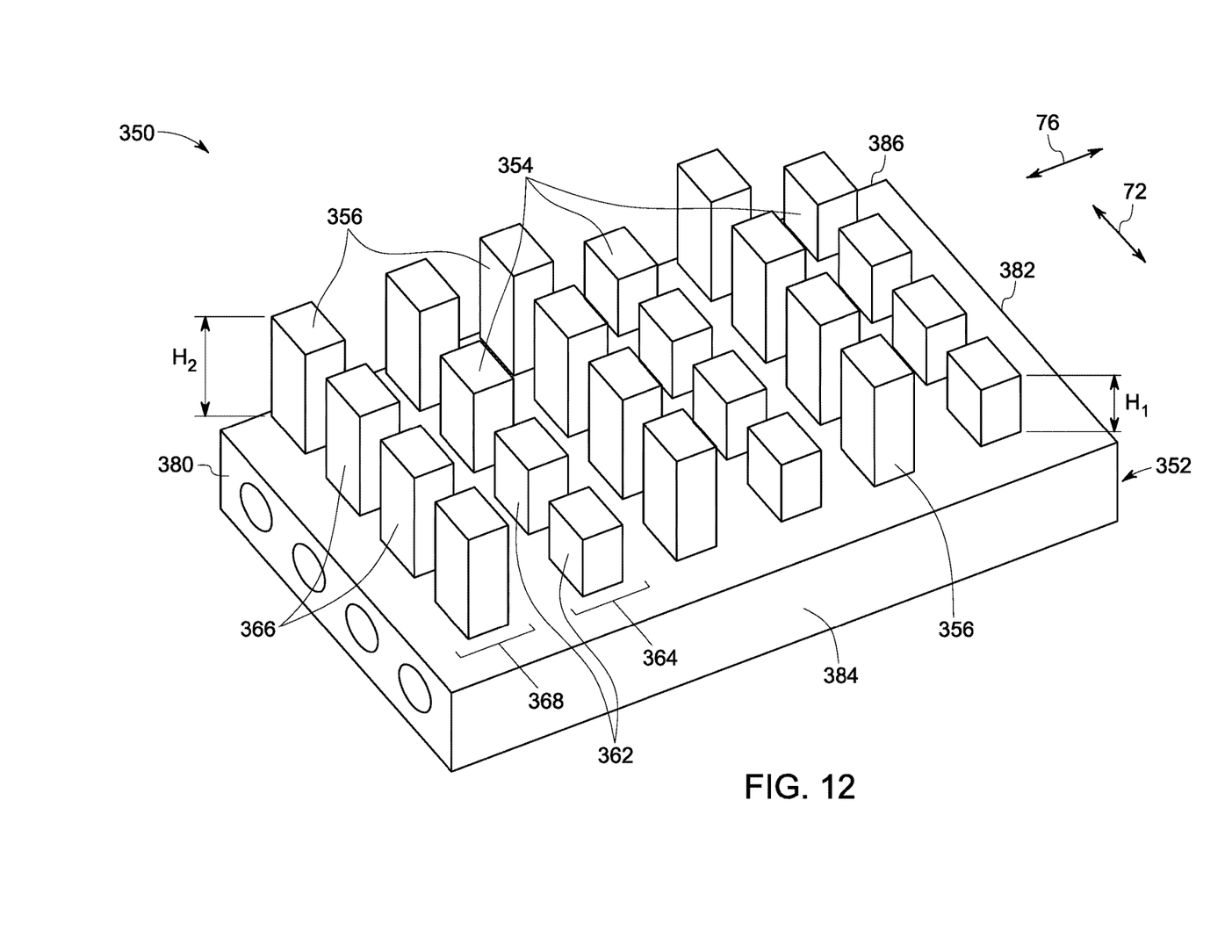
FIG. 12 is a perspective view of a surface cooler having gradually increased discrete first sub-fins in at least one first row, in accordance with aspects of the present technique.

FIG. 12 is a perspective view of a surface cooler 350 in accordance with one embodiment of the present technique. In one embodiment, the surface cooler 350 includes a base component 352, a plurality of first fins 354, and a plurality of second fins 356.

The base component 352 includes a first peripheral side 380, a second peripheral side 382, a third peripheral side 384, and a fourth peripheral side 386. The plurality of first fins 354 includes discrete first sub-fins 362 arranged in a first row of a plurality of first rows 364. The plurality of second fins 356 includes discrete second sub-fins 366 arranged in a second row of a plurality of second rows 368. Each fin among the discrete first sub-fins 362 is characterized by a first height "$H_1$" and each fin among the discrete second sub-fins 366 is characterized by a second height "$H_2$". In one embodiment, the first height "$H_1$" in at least one first row 364 is configured to be gradually increased along an axial direction 72 of the engine. Specifically, the first height "$H_1$" is gradually increased from the third peripheral side 384 to the fourth peripheral side 386. In such embodiments, the second height "$H_2$" in the plurality of second rows 368 is configured to be substantially uniform along the axial direction 72 of the engine. The surface cooler 350 as discussed herein may reduce air drag, pressure drop, and augment heat transfer capacity.

In some embodiments, the first height "$H_1$" in at least one first row 364 may be configured to be gradually decreased along the axial direction 72 of the engine. In such embodiments, the second height "$H_2$" in the plurality of second rows 368 may be configured to be substantially uniform along the axial direction 72 of the engine.

In some other embodiments, the first height "$H_1$" in one first row 364 may be configured to be gradually increased and in another first row 364 may be configured to be gradually decreased, along the axial direction 72 of the engine. In such embodiments, the second height "$H_2$" in the plurality of second rows 368 may be configured to be substantially uniform along the axial direction 72 of the engine.

Figure 13:
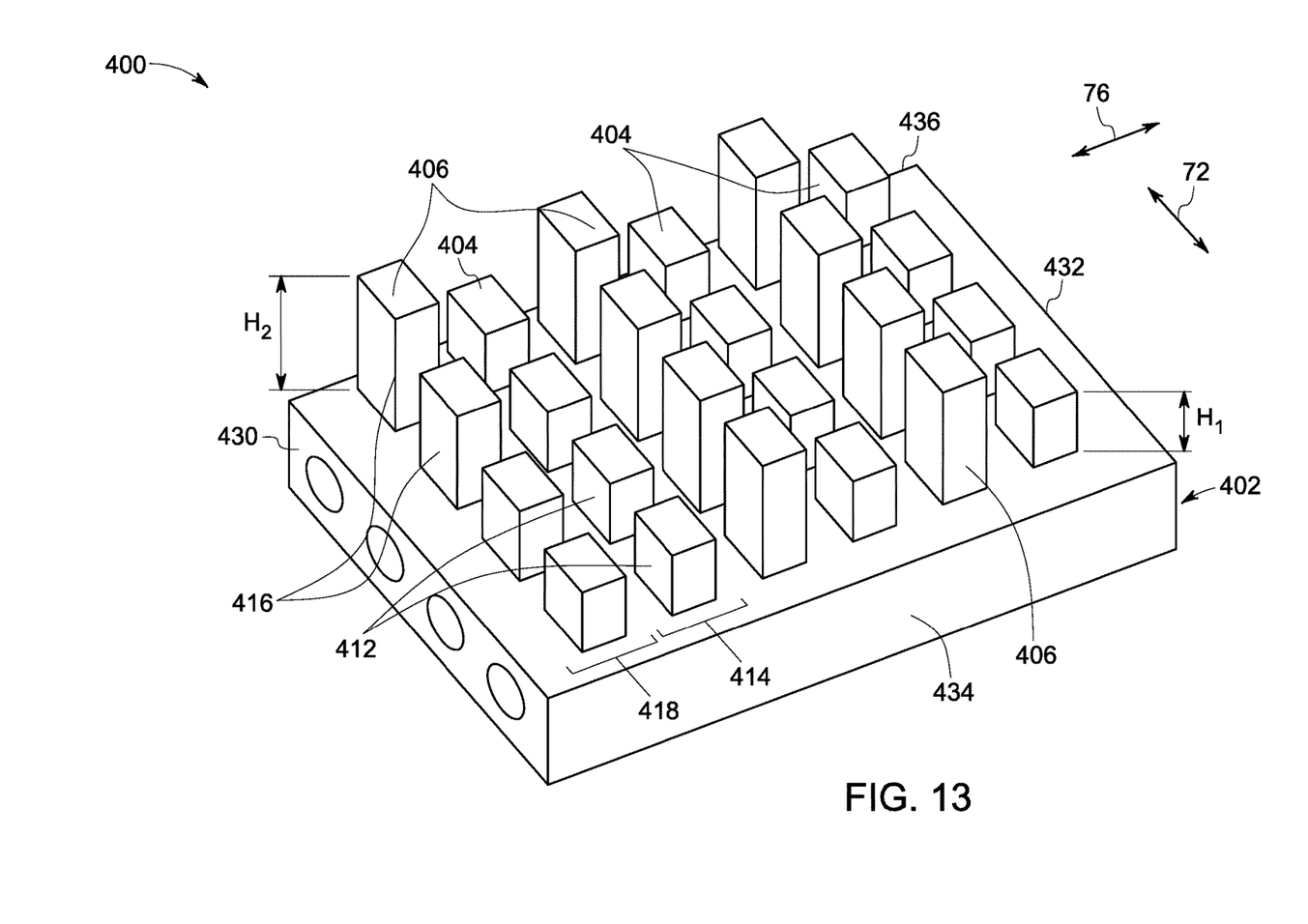
FIG. 13 is a perspective view of a surface cooler having a gradually increased discrete second sub-fins in at least one second row, in accordance with aspects of the present technique.

FIG. 13 is a perspective view of a surface cooler 400 in accordance with one embodiment of the present technique. In one embodiment, the surface cooler 400 includes a base component 402, a plurality of first fins 404, and a plurality of second fins 406.

The base component 402 includes a first peripheral side 430, a second peripheral side 432, a third peripheral side 434, and a fourth peripheral side 436. The plurality of first fins 404 includes discrete first sub-fins 412 arranged in a first row of a plurality of first rows 414. Similarly, the plurality of second fins 406 includes discrete second sub-fins 416 in a second row of a plurality of second rows 418. Each fin among the discrete first sub-fins 412 is characterized by a first height "$H_1$" and each fin among the discrete second sub-fins 416 is characterized by a second height "$H_2$". In one embodiment, the first height "$H_1$" in the plurality of first rows 414 is configured to be substantially uniform along an axial direction 72 of the engine. In such embodiments, a second height "$H_2$" in at least one second row 418 is configured to be gradually increased along the axial direction 72 of the engine. Specifically, the second height "$H_2$" is gradually increased from the third peripheral side 434 to the fourth peripheral side 436. The surface cooler 400 as discussed herein may reduce air drag, pressure drop, and augment heat transfer capacity.

In some embodiments, the second height "$H_2$" in at least one second row 418 may be configured to be gradually decreased along the axial direction 72 of the engine. In such embodiments, the first height "$H_1$" in the plurality of first rows 414 may be configured to be substantially uniform along the axial direction of the engine.

In some other embodiments, the second height "$H_2$" in one second row 418 may be configured to be gradually increased and in another second row 418 may be configured to be gradually decreased, along the axial direction 72 of the engine. In such embodiments, the first height "$H_1$" in the plurality of first rows 414 may be configured to be substantially uniform along the axial direction of the engine.

In accordance with one or more embodiments discussed herein, a surface cooler having an optimal variation in fins heights may significantly improve the heat dissipation capacity without adding specific fuel consumption (SFC) penalty to an underlying engine. The surface cooler having greater fin heights along at least one of an axial direction and a circumferential direction of an engine reduces air drag between fins. Hence, higher flow rates may be achieved between the larger fins. Further, the surface cooler having smaller fins heights contribute to the heat dissipation through increased surface area and also through flow conditioning, e.g. vortex shedding or enhanced mixing in inter-fin passages defined between such fins.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:

1. A surface cooler comprising:
   a base component having a first surface and a second surface, wherein the base component comprises a first thermally conductive material;
   a plurality of first fins extending substantially perpendicular from the first surface of the base component, wherein each fin of the plurality of first fins is characterized by a first height and a first width; and
   a plurality of second fins extending substantially perpendicular from the first surface of the base component, wherein each fin of the plurality of second fins is characterized by a second height and, a second width,
   wherein one or more fins of the plurality of first fins are disposed between a pair of adjacent fins of the plurality of second fins, wherein an average first height of the plurality of first fins is lower than an average second height of the plurality of second fins wherein the base component comprises at least one conduit disposed between the first and second surfaces and configured to receive a fluid, and wherein the first height of the plurality of first fins is configured to be gradually increased or decreased along at least one of a circumferential direction and an axial direction of an engine.

2. The surface cooler of claim 1, wherein an average second width of the plurality of second fins is greater than an average first width of the plurality of first fins.

3. A surface cooler comprising:
   a base component having a first surface and a second surface, wherein the base component comprises a first thermally conductive material;
   a plurality of first fins extending substantially perpendicular from the first surface of the base component wherein each fin of the plurality of first fins is characterized by a first height and a first width; and
   a plurality of second fins extending substantially perpendicular from the first surface of the base component, wherein each fin of the plurality of second fins is characterized by a second height and a second width,
   wherein one or more fins of the plurality of first fins are disposed between a pair of adjacent fins of the plurality of second fins, wherein a average first height of the plurality of first fins is lower than an average second height of the plurality of second fins, wherein the base component comprises at least one conduit disposed between the first and second surfaces and configured to receive a fluid, and wherein the second height of the plurality of second fins is configured to be gradually increased or decreased along at least one of a circumferential direction, and an axial direction of an engine.

4. The surface cooler of claim 3, wherein an average second width of the plurality of second fins is greater than an average first width of the plurality of first fins.

5. A surface cooler comprising:
   a base component having a first surface and a second surface wherein the base component comprises a first thermally conductive material;
   a plurality of first fins extending substantially perpendicular from the first surface of the base component, wherein each fin of the plurality of first fins is characterized by a first height and a first width; and
   a plurality of second fins extending substantially perpendicular from the first surface of the base component, wherein each fin of the plurality of second fins is characterized by a second height and a second width,
   wherein one or more fins of the plurality of first fins are disposed between a pair of adjacent fins of the plurality of second fins, wherein an average first height of the plurality of first fins is lower than an average second height of the plurality of second fins, wherein the base component comprises at least one conduit disposed between the first and second surfaces and configured to receive a fluid, and wherein the plurality of first fins comprises a second thermally conductive material.

6. The surface cooler of claim 5, wherein the plurality of second fins comprises a third thermally conductive material.

7. The surface cooler of claim 6, wherein the first, second, and third thermally conductive materials comprise one of a metal, a metal foam, a carbon foam, or combinations thereof.

8. The surface cooler of claim 5, wherein an average second width of the plurality of second fins is greater than an average first width of the plurality of first fins.

9. A surface cooler comprising:
   a base component having a first surface and a second surface, wherein the base component comprises a first thermally conductive material;
   a plurality of first fins extending substantially perpendicular from the first surface of the base component wherein each fin of the plurality of first fins is characterized by a first height and a first width; and
   a plurality of second fins extending substantially perpendicular from the first surface of the base component, wherein each fin of the plurality of second fins is characterized by a second height and a second width,
   wherein one or more fins of the plurality of first fins are disposed between a pair of adjacent fins of the plurality of second fins, wherein an average first height of the plurality of first fins is lower than an average second height of the plurality of second fins, wherein the base component comprises at least one conduit disposed between the first and second surfaces and configured to receive a fluid, and wherein at least one fin of the plurality of first fins comprises discrete first sub-fins arranged in a first row of a plurality of first rows.

10. The surface cooler of claim 9, wherein the first height of the discrete first sub fins is configured to be gradually increased, decreased, or both in the first row and an adjacent first row of the plurality of first rows, along an axial direction of an engine.

11. The surface cooler of claim 9, wherein at least one fin of the plurality of second fins comprises discrete second sub-fins arranged in a second row of a plurality of second rows.

12. The surface cooler of claim 11, wherein the second height of the discrete second fins is configured to be gradually increased, decreased, or both along at least one of the second row and an adjacent second row of the plurality of second rows, along an axial direction of an engine.

13. The surface cooler of claim 9, wherein an average second width of the plurality of second fins is greater than an average first width of the plurality of first fins.

14. An engine comprising:
a core engine comprising an engine casing;
a fan assembly comprising a fan casing and an outlet guide vane disposed between the engine casing and the fan casing; and
a surface cooler coupled to at least one or both of i) a portion of the engine casing and ii) a portion of the fan casing, wherein the surface cooler comprises:
a base component having a first surface and a second surface, wherein the base component comprises a first thermally conductive material;
a plurality of first fins extending substantially perpendicular from the first surface of the base component, wherein each first fin of the plurality of first fins is characterized by a first height and a first width, and wherein the plurality of first fins comprises a second thermally conductive material; and
a plurality of second fins extending substantially perpendicular from the first surface of the base component, wherein each second fin of the plurality of second fins is characterized by a second height and a second width,
wherein one or more first fins of the plurality of first fins are disposed between a pair of adjacent second fins of the plurality of second fins, wherein an average first height of the plurality of first fins is lower than an average second height of the plurality of second fins, and wherein the base component comprises at least one conduit disposed between the first and second surfaces and configured to receive a fluid.

15. The engine of claim 14, wherein the surface cooler is disposed proximate to at least one of an upstream end of the outlet guide vane and a downstream end of the outlet guide vane, wherein the upstream end and the downstream end are relative to a direction, of air flowing through the surface cooler.

16. The engine of claim 14, wherein an average second width of the plurality of second fins is greater than an average first width of the plurality of first fins.

17. An engine comprising:
a core engine comprising an engine casing;
a fan assembly comprising a fan casing and an outlet guide vane disposed between the engine casing and the fan casing; and
a surface cooler coupled to at least one or both of i) a portion of the engine casing and ii) a portion of the fan casing, wherein the surface cooler comprises:
a base component having a first surface and a second surface, wherein the base component comprises a first thermally conductive material;
a plurality of first fins extending substantially perpendicular from the first surface of the base component, wherein each first fin of the plurality of first fins is characterized by a first height and a first width; and
a plurality of second fins extending substantially perpendicular from the first surface of the base component, wherein each second fin of the plurality of second fins is characterized by a second height and a second width,
wherein one or more first fins of the plurality of first fins are disposed between a pair of adjacent second fins of the plurality of second fins, wherein an average first height of the plurality of first fins is lower than an average second height of the plurality of second fins, wherein the base component comprises at least one conduit disposed between the first and second surfaces and configured to receive a fluid, and wherein the first height of the plurality of first fins is gradually increased or decreased along at least one of a circumferential direction and an axial direction of the engine.

18. The engine of claim 17, wherein the surface cooler is disposed proximate to at least one of an upstream end of the outlet guide vane and a downstream end of the outlet guide vane, wherein the upstream end and the downstream end are relative to a direction of air flowing through the surface cooler.

19. The engine of claim 17, wherein an average second width of the plurality of second fins is greater than an average first width of the plurality of first fins.

20. An engine comprising:
a core engine comprising an engine casing;
a fan assembly comprising a fan casing and an outlet guide vane disposed between the engine casing and the fan casing; and
a surface cooler coupled to at least one or both of i) a portion of the engine casing and ii) a portion of the fan casing, wherein the surface cooler comprises:
a base component having a first surface and a second surface, wherein the base component comprises a first thermally conductive material;
a plurality of first fins extending substantially perpendicular from the first surface of the base component, wherein each first fin of the plurality of first fins is characterized by a first height and a first width; and
a plurality of second fins extending substantially perpendicular from the first surface of the base component, wherein each second fin of the plurality of second fins is characterized by a second height and a second width,
wherein one or more first fins of the plurality of first fins are disposed between a pair of adjacent second fins of the plurality of second fins, wherein an average first height of the plurality of first fins is lower than an average second height of the plurality of second fins, wherein the base component comprises at least one conduit disposed between the first and second surfaces and configured to receive a fluid, and wherein the second height of the plurality of second fins is gradually increased or decreased along at least one of a circumferential direction and an axial direction of the engine.

21. The engine of claim 20, wherein an average second width of the plurality of second fins is greater than an average first width of the plurality of first fins.

22. The engine of claim 20, wherein the surface cooler is disposed proximate to at least one of an upstream end of the outlet guide vane and a downstream end of the outlet guide vane, wherein the upstream end and the downstream end are relative to a direction of air flowing through the surface cooler.

23. An engine comprising:
a core engine comprising an engine casing;
a fan assembly comprising a fan casing and an outlet guide vane disposed between the engine casing and the fan casing; and
a surface cooler coupled to at least one or both of i) a portion of the engine casing and ii) a portion of the fan casing, wherein the surface cooler comprises:

a base component having a first surface and a second surface, wherein the base component comprises a first thermally conductive material;

a plurality of first fins extending substantially perpendicular from the first surface of the base component, wherein each first fin of the plurality of first fins is characterized by a first height and a first width; and a plurality of second fins extending substantially perpendicular from the first surface of the base component wherein each second fin of the plurality of second fins is characterized by a second height and a second width, wherein one or more first fins of the plurality of first fins are disposed between a pair of adjacent second fins of the plurality of second fins, wherein an average first height of the plurality of first fins is lower than an average second height of the plurality of second fins, wherein the base component comprises at least one conduit disposed between the first and second surfaces and configured to receive a fluid, and wherein at least one fin of the plurality of first fins comprises discrete first sub-fins arranged in a first row of a plurality of first rows.

24. The engine of claim 23, wherein at least one fin of the plurality of second fins comprises discrete second sub-fins arranged in a second row of a plurality of second rows.

25. The engine of claim 24, wherein the first height of the discrete first sub-fins is gradually increased, decreased, or both in the first row and an adjacent first row of the plurality of first rows, along an axial direction of the engine.

26. The engine of claim 24, wherein the second height of the discrete second sub-fins is gradually increased, decreased, or both in the second row and an adjacent second row of the plurality of second rows, along an axial direction of the engine.

27. The engine of claim 23, wherein the surface cooler is disposed proximate to at least one of an upstream end of the outlet guide vane and a downstream end of the outlet guide vane, wherein the upstream end and the downstream end are relative to a direction of air flowing through the surface cooler.

28. The engine of claim 23, wherein an average second width of the plurality of second fins is greater than an average first width of the plurality of first fins.

* * * * *